Figure 1:
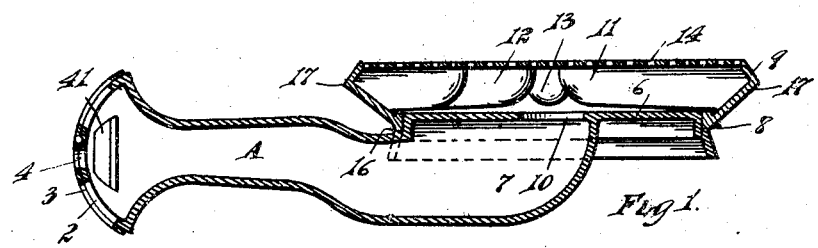

No. 789,662. PATENTED MAY 9, 1905.
W. J. KEEP & H. C. MAUL.
GAS BURNER.
APPLICATION FILED NOV. 12, 1904.

2 SHEETS—SHEET 1.

WITNESSES
T. Masury
C. F. Doy

INVENTORS
William J. Keep
Henry C. Maul
By Parker & Burton Attorneys.

No. 789,662. PATENTED MAY 9, 1905.
W. J. KEEP & H. C. MAUL.
GAS BURNER.
APPLICATION FILED NOV. 12, 1904.
2 SHEETS—SHEET 2.
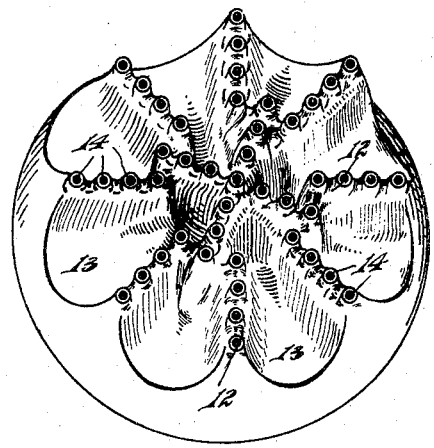
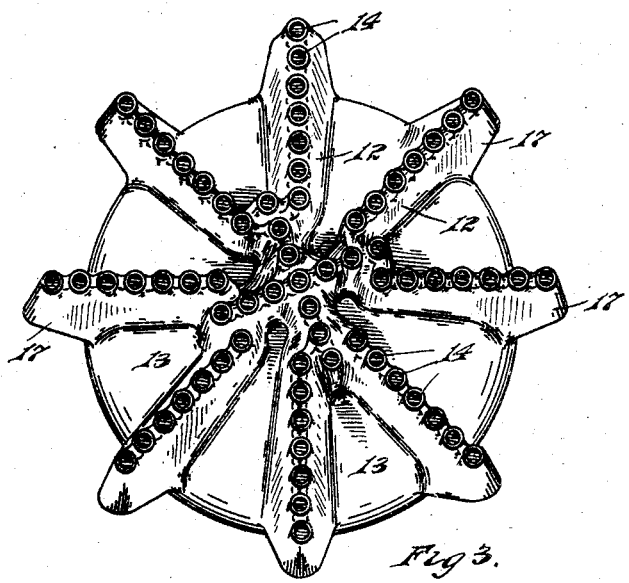
WITNESSES
T. Massey
C. F. Dry
INVENTORS
William J. Keep
Henry C. Maul
By Parker & Burton
Attorneys.

No. 789,662. Patented May 9, 1905.

UNITED STATES PATENT OFFICE.

WILLIAM J. KEEP AND HENRY C. MAUL, OF DETROIT, MICHIGAN, ASSIGNORS TO MICHIGAN STOVE COMPANY, OF DETROIT, MICHIGAN.

GAS-BURNER.

SPECIFICATION forming part of Letters Patent No. 789,662, dated May 9, 1905.

Application filed November 12, 1904. Serial No. 232,407.

*To all whom it may concern:*

Be it known that we, WILLIAM J. KEEP and HENRY C. MAUL, citizens of the United States, residing at Detroit, county of Wayne, State of Michigan, have invented a certain new and useful Improvement in Gas-Burners; and we declare the following to be a full, clear, and exact description of the invention, such as will enable others skilled in the art to which it pertains to make and use the same, reference being had to the accompanying drawings, which form a part of this specification.

This invention relates to gas-burners.

It has for its object an improved device for producing and maintaining the proper combination of air and gas to burn with the hot blue flame desirable for heating and cooking purposes.

The combination of air and gas or oxygen and gas takes place slowly and gradually. If the heat produced by the combination of a particle of hydrogen and a particle of oxygen or a particle of carbon and a particle of oxygen is transmitted to another particle of carbon which is not yet in close union with the requisite amount of oxygen to form the chemical union, the carbon is heated to incandescence and there is produced what is known as the "white light" or "yellow light." If, however, the requisite amount of oxygen to form carbon monoxid is closely adjacent, the chemical union takes place, and the only visible effects are the light-blue light or the green light. The subsequent combination to form the carbon dioxid, if it takes place at all, is accompanied by the visible effect of blue light or green light and not with the production of white light or yellow light.

The improvements in devices for the burning of gases for the production of heat have been mainly directed to the production of an intimate mixture of air and the fuel-gases or other hydrocarbon prior to subjecting the mixture to heat sufficient to produce the chemical union and the subsequent admission of an additional supply of air or oxygen after the first application of heat and after the gas or a large part of it has formed a chemical union with oxygen with the object of producing an intimate mixture of the carbon monoxid contemporaneous with or immediately preceding the secondary burning and final complete chemical union to form the carbon dioxid and the water-vapor.

The object of this invention is to produce the first mixture before the mixture is heated, to disperse or scatter the mixture evenly to the place of combustion for the purpose of producing a broadly-extended and even flame, to obviate the possibility of an uneven flame due to unequal pressures of gas in various parts of the chamber beneath the burner-plate, and for the purpose of producing the secondary mixture and complete combustion of the fuel in an advantageous manner and without the use of high confining-walls.

It has been found by experience that (assuming that the usual pressure of gas is available) the accurate spacing of the burner-holes is a large factor in accomplishing the result of instantaneous ignition of all the jets when on the gas being turned on a lighted match is applied to any one. Five-sixteenths of an inch seems to be the maximum distance permissible. If there is a greater intervening space there is an appreciable stop or halt between the ignition of each successive jet in the line until the intervening air-space has become sufficiently impregnated with gas to allow the flame to jump across. During this time unburned gas would be escaping from the unlighted holes. To produce the best results, the greatest possible number of jets, with conditions favorable to perfect combustion, must be crowded into the smallest possible area.

Figure 2:
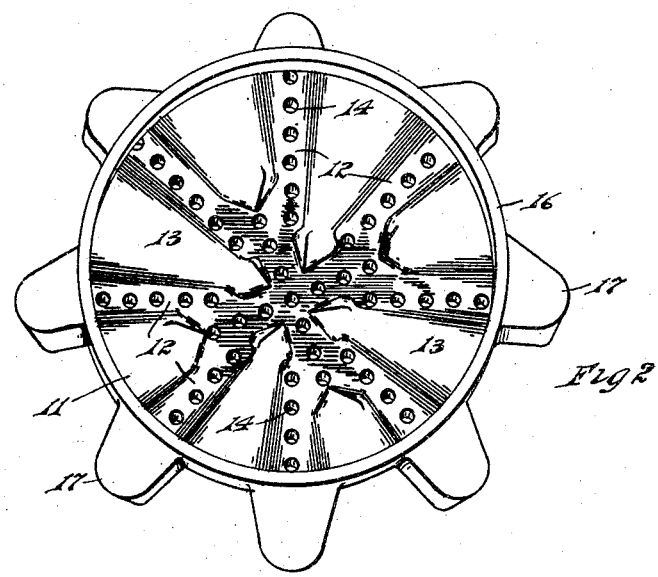
Figure 4:
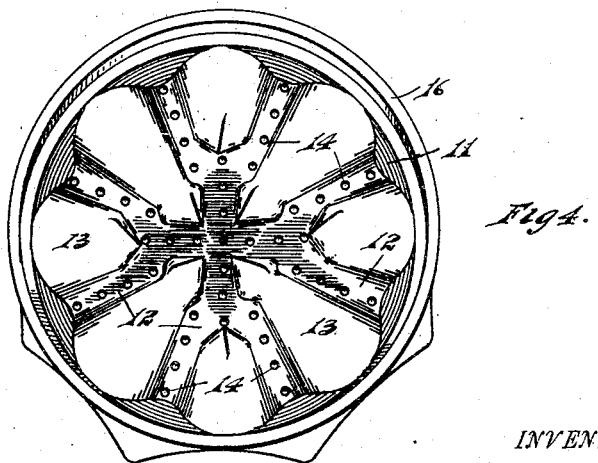

In the drawings, Figure 1 shows the burner in section longitudinal of the mixer and across the burner. Fig. 2 is a perspective showing the inside or lower side of a burner-cap of large diameter compared to the seat on which it rests. Fig. 3 is a perspective showing the top or upper side of the cap of Fig. 2. Fig. 4 is a perspective showing the lower or under side of a cap having perforations of smaller dimensions. Fig. 5 is a perspective showing the top of the cap of Fig. 4.

The lower part or the mixing part of the structure consists of a pipe A, with a bell-mouth opening covered by a foraminous closure 2, having a central opening 4 for the admission of the gas-pipe, (not shown,) and with openings 41 in a ring around the center closable by a shifting plate 3, that either opens or closes the openings through the closure 2. The chamber within the pipe enlarges toward the burner, and the confining-walls of the chamber extend beyond the middle of a circular plate 6, which forms one side of the confining-chamber 7 and which is provided with a flanged seat 8 for the engagement thereon of the burner-cap 9. The circular plate 6 is provided at its center with an opening 10, through which the mixture escapes into the supply-chamber 11 above the plate 6 and under the burner-cap. The burner-cap is formed with a radially-branching cavity having numerous high chambers 12 divided by hanging walls 13, which curve downward and almost reach the top surface of the plate 6, leaving a low chamber extending entirely over the surface of the plate 6, around which the gases may travel freely. Under each row of burner-holes 14 the supply-chamber rises, and the exit for the gases at the point of combustion is elevated. At each side of the row of burner-holes on the outside the surface-wall of the plate descends abruptly, producing deep channels on the outside between each pair of rows of exit-holes for the gas, and there is a free access of air along the entire row of holes to the center and thence from the center outward. Across the center and at the center of the burner-cap the burner-holes are made in two rows crossing each other at right angles, and these two rows extend in each direction from the center and fork, each row being continued for a distance and then dividing into two rows which diverge. By this construction it is possible to bring the deep air-conducting channel to the center of the burner to furnish the secondary supply of air in liberal quantities to those burner-holes which are at or near the center, and it is also possible to increase the number of holes or multiply the number of holes by making the rows of holes more numerous at parts of the cap distant from the center. The channels for the passage of air are continued in straight lines, widening gradually from the center toward the periphery. The under side of the cap is provided with a tooled flange 16, adapted to fit closely on the seat 8, and if it be desired to employ a burner larger than the seat 8 or having a diameter greater than that of the seat 8 the several raised portions through which the exit-holes are made are carried beyond the ring in overhanging points 17. Preferably the part of burner which surrounds each exit-hole is raised slightly above the ridge, and the material is tooled or finished with a flat surface prior to drilling the exit-holes in order that the perforation and limiting-walls around the perforation may have a regular and finished edge, across which the gas can travel in a way to produce a uniform or regular cone of flame at each exit.

What we claim is—

1. In a gas mixer, and burner, in combination with a base provided with a mixing-chamber, a cap provided with rows of holes extending along radial elevations on said cap and having depressions between consecutive rows of holes, which depressions extend from the outside of the cap inward, a chamber under said cap and a centrally-perforated diaphragm separating the two chambers, substantially as described.

2. A burner-cap for gas-burners, provided with two rows of holes crossing at the center and with each row branching into a multiple of rows at points intermediate the center and the circumference, substantially as described.

3. A burner-cap provided with a plurality of intersecting rows of holes in the central portion of its surface, and with other rows of holes extending from points adjacent to the ends of said first-mentioned rows toward the outer edge of the cap, there being air-conveying channels in the surface of said cap intermediate the several rows of holes, substantially as described.

4. A burner-cap having a plurality of rows of holes in the central portion, and other rows of holes leading from one of said first-mentioned rows toward the outer edge, there being air-conveying channels in the surface of said cap between adjacent rows, substantially as described.

5. In a gas-burner, in combination with a mixing-chamber, a chamber under the gas-exit holes, a plate forming a diaphragm between said chambers and provided with an opening for the escape of gas therefrom, a cap-seat concentric with the center of said opening, a cap provided with gas-exit holes on elevated portions thereof, and with depressions of the cap-wall between the holes, said depressions of the wall dividing the chamber under the cap radially, substantially as described.

6. A burner having in combination with a base-plate provided with a seat, a cap having its under and inner surface provided with a number of radial depressions dividing the chamber beneath the cap into radially-arranged chambers, a mixing-chamber beneath the radial chambers, and a centrally-perforated diaphragm between the radial chambers and the mixing-chamber, substantially as described.

7. In a gas-burner, a cap provided on its under side with radial hanging parts, a seat for said cap and a perforated diaphragm forming the under side of a chamber beneath said cap, the said radial depressions stopping short of the plate, whereby there is formed a separate chamber extending over said plate with high parts radiating from the center thereof, substantially as described.

8. A burner-cap, having in combination a mixing-chamber, a diaphragm thereover perforated at its central portion, and a plurality of radially-extending supply-chambers communicating at their inner ends with each other and with the perforation in said diaphragm, the cap being perforated with burner-holes over each branch of said supply-chamber, substantially as described.

9. In a gas mixer and burner, in combination with a mixing-chamber, a supply-chamber for the burners, and an intervening perforated diaphragm, the upper surface of said supply-chamber being provided with rows of holes extending along radial elevations on said surface, and having depressions between consecutive rows of holes, said depressions extending from the outside of said surface inward, substantially as described.

10. In a gas-burner, in combination with a mixing-chamber and a supply-chamber, an intervening perforated diaphragm and rows of holes extending along radial elevations in the upper surface of said mixing-chamber, there being intervening depressions in said surface between the rows of holes adapted to provide a free supply of air to all of said holes, substantially as described.

11. In a gas-burner, a cap provided on its under side with radial hanging parts, a seat for said cap and a perforated diaphragm forming the under side of a mixing-chamber and the top side of a supply-chamber, said mixing chamber extending radially over said diaphragm, substantially as described.

12. A burner-cap having in combination with a mixing-chamber, and a centrally-perforated diaphragm across the top thereof, elevated burner-openings with depressions between them extending radially from the center, substantially as described.

In testimony whereof we sign this specification in the presence of two witnesses.

WILLIAM J. KEEP.
HENRY C. MAUL.

Witnesses:
　LOTTA LEE HAYTON,
　MAY E. KOTT.